United States Patent
Na et al.

(10) Patent No.: US 9,315,001 B2
(45) Date of Patent: Apr. 19, 2016

(54) METHOD AND APPARATUS FOR TRANSFERRING GRAPHENE

(75) Inventors: Duk-Hwa Na, Changwon (KR);
Jong-Hyuk Yoon, Changwon (KR);
Young-Il Song, Changwon (KR);
Dong-Kwan Won, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 413 days.

(21) Appl. No.: 13/988,250

(22) PCT Filed: Nov. 17, 2011

(86) PCT No.: PCT/KR2011/008779
§ 371 (c)(1),
(2), (4) Date: May 17, 2013

(87) PCT Pub. No.: WO2012/067438
PCT Pub. Date: May 24, 2012

(65) Prior Publication Data
US 2013/0233480 A1    Sep. 12, 2013

(30) Foreign Application Priority Data

Nov. 19, 2010    (KR) .......................... 10-2010-0115736

(51) Int. Cl.
*B29C 65/00*    (2006.01)
*B32B 37/10*    (2006.01)
(Continued)

(52) U.S. Cl.
CPC ........... *B32B 37/025* (2013.01); *C01B 31/0453* (2013.01); *C01B 31/0484* (2013.01); *B65H 19/29* (2013.01); *Y10T 156/1702* (2015.01)

(58) Field of Classification Search
CPC .............. B32B 37/025; C01B 31/0484; C01B 31/0453; Y10T 156/1702; Y10T 156/11; B65H 19/29
USPC .......... 156/235, 241, 247, 249, 582, 446, 567
See application file for complete search history.

(56) References Cited

U.S. PATENT DOCUMENTS 8,507,895 B2 *   8/2013   Choi .................. H01L 51/5206
                                                      257/40
9,096,050 B2 *   8/2015   Bedell .................. B32B 43/006
(Continued)

FOREIGN PATENT DOCUMENTS

KR         1020090028007 A  *  3/2009

OTHER PUBLICATIONS

Chinese Office Action for CN201180055772.X.*
(Continued)

*Primary Examiner* — Sonya Mazumdar
(74) *Attorney, Agent, or Firm* — Sughrue Mion, PLLC

(57) ABSTRACT

Provided are method and apparatus for transferring graphene. The graphene transferring method includes: a graphene synthesizing operation comprising forming at least one layer of graphene on at least one surface of a catalyst metal film; a substrate film attaching operation comprising contacting an adhesive first surface of the substrate film to the at least one layer of graphene and compressing the catalyst metal film and the substrate film by using a first roller; and a substrate film separating operation comprising separating the substrate film from the catalyst metal film such that the at least one layer of graphene is separated from the catalyst metal film together with the substrate film.

4 Claims, 3 Drawing Sheets

(51) Int. Cl.
- *B32B 38/10* (2006.01)
- *B32B 38/14* (2006.01)
- *B32B 37/00* (2006.01)
- *C01B 31/04* (2006.01)
- *B32B 38/18* (2006.01)
- *B65C 9/30* (2006.01)
- *B65H 19/29* (2006.01)

(56) References Cited

U.S. PATENT DOCUMENTS

| | | | |
|---|---|---|---|
| 2010/0126660 A1* | 5/2010 | O'Hara | B32B 37/12 156/249 |
| 2011/0030879 A1* | 2/2011 | Veerasamy | B82Y 30/00 156/99 |
| 2011/0100951 A1* | 5/2011 | Juang | B32B 37/025 216/13 |
| 2011/0308717 A1* | 12/2011 | Cho | B32B 37/025 156/249 |
| 2011/0315657 A1* | 12/2011 | Cho | B32B 37/025 216/36 |
| 2013/0220530 A1* | 8/2013 | Gong | B32B 38/10 156/247 |
| 2013/0299077 A1* | 11/2013 | Hong | B82B 3/0076 156/249 |

OTHER PUBLICATIONS

Juang, et al.; "Graphene Synthesis by Chemical Vapor Deposition and Transfer by a Roll-to-Roll Process", 2010, vol. 48, pp. 3169-3174.

Communication dated Mar. 18, 2014, issued by the State Intellectual Property Office of the People's Republic of China in counterpart Chinese Application No. 201180055772.X.

* cited by examiner

METHOD AND APPARATUS FOR TRANSFERRING GRAPHENE

TECHNICAL FIELD

The present invention relates to methods and apparatuses for transferring graphene to a substrate.

BACKGROUND ART

Graphene refers to a two-dimensional (2D) planar material in a honeycomb lattice in which carbons are connected in hexagonal shapes, which is very thin and transparent and has great electrical conductivity. Graphenes are increasingly used in transparent displays or bendable displays due to these characteristics. Recently, various attempts are being made to synthesize large sized graphene.

Graphene is generally synthesized by using a chemical vapor deposition (CVD) method by using a catalyst metal.

To transfer the graphene synthesized on a surface of a catalyst metal by using the CVD method, to a substrate film, a thermal release tape is attached on the graphene, the catalyst metal is removed by etching, and then the graphene attached to the thermal release tape is transferred to the substrate film.

DISCLOSURE OF INVENTION

Technical Problem

The method of transferring graphene may cause damage to the graphene when etching the catalyst metal. In addition, when adhering the graphene attached to a thermal release tape to the substrate film and separating the thermal release tape, the graphene may be damaged by the heat. Also, when attaching or detaching the graphene to or from the thermal release tape, mechanical damage such as wrinkles or other damage to the graphenes may occur.

Solution to Problem

One or more embodiments of the present invention provide a method of transferring graphene in which graphene formed on a catalyst metal is directly transferred onto a substrate film, thereby simplifying a graphene transferring operation and increasing the speed of the graphene transferring operation, and preventing damage to the graphene during the graphene transferring operation.

The present invention also provides an apparatus for manufacturing graphene which is capable of implementing the above graphene transferring method.

According to an aspect of the present invention, there is provided a method of transferring graphene, the method comprising: a graphene synthesizing operation comprising forming at least one layer of graphene on at least one surface of a catalyst metal film; a substrate film attaching operation comprising contacting an adhesive first surface of the substrate film to the graphene and compressing the catalyst metal film and the substrate film by using a first roller; and a substrate film separating operation comprising separating the substrate film from the catalyst metal film such that the at least one layer of graphene is separated from the catalyst metal film together with the substrate film.

According to another aspect of the present invention, there is provided a graphene transferring apparatus comprising: a catalyst metal film, on at least one surface of which at least one layer of graphene is formed, wherein the catalyst metal film is transported in a predetermined direction; a first unwinding reel disposed by winding a substrate film having an adhesive first surface around the first unwinding reel; a first roller that presses the substrate film toward the catalyst metal film so that the adhesive first surface of the substrate film which is unwound from the first unwinding reel is adhered to the at least one layer of graphene; and a first winding reel that separates the substrate film from the catalyst metal film that has passed through the first roller and winds the separated substrate film.

Advantageous Effects of Invention

According to the method of transferring graphene according to an embodiment of the present invention, graphene formed on a catalyst metal is directly transferred to the substrate film. Accordingly, the graphene transferring method may be simplified and a speed thereof may be increased, and damage to the graphene caused during a graphene transferring operation may be effectively reduced.

In addition, the method of transferring graphene may be effectively performed by using the apparatus for manufacturing graphene according to another embodiment of the present invention.

BRIEF DESCRIPTION OF DRAWINGS

The above and other features and advantages of the present invention will become more apparent by describing in detail exemplary embodiments thereof with reference to the attached drawings in which.

MODE FOR THE INVENTION

Hereinafter, preferred embodiments of the present invention will be described with reference to the attached drawings.

Figure 1:
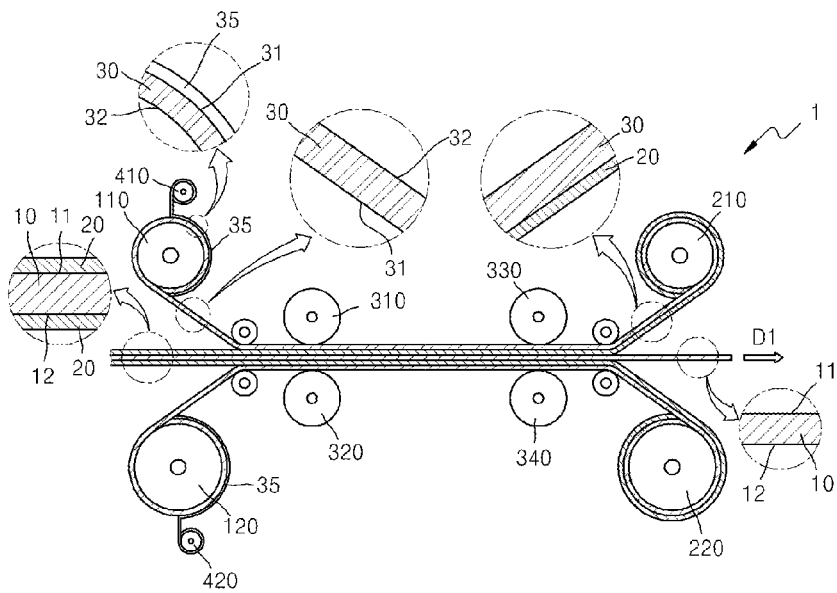
FIG. 1 is a schematic view illustrating a graphene transferring apparatus according to an embodiment of the present invention.
Figure 2:
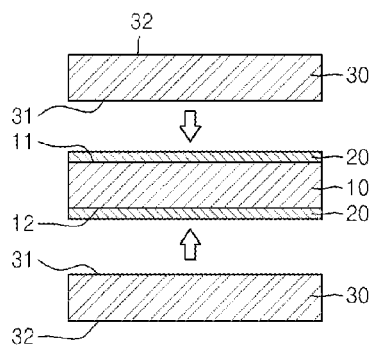
FIGS. 2 through 4 are cross-sectional views illustrating an operation in which graphene is transferred from a catalyst metal film to a substrate film in the graphene transferring apparatus illustrated in FIG. 1, according to an embodiment of the present invention.
Figure 3:
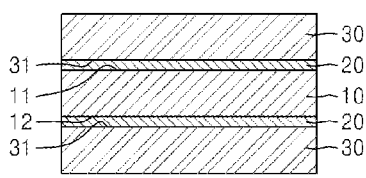
Figure 4:
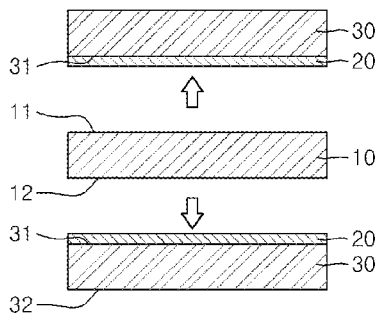

FIG. 1 is a schematic view illustrating a graphene transferring apparatus 1 according to an embodiment of the present invention. FIGS. 2 through 4 are cross-sectional views illustrating an operation in which graphene is transferred from a catalyst metal film to a substrate film in the graphene transferring apparatus illustrated in FIG. 1, according to an embodiment of the present invention.

The method of transferring graphene according to the current embodiment of the present invention includes a graphene synthesizing operation, a substrate film attaching operation, and a substrate film separating operation.

In the graphene synthesizing operation, graphene 20 is formed on two surfaces 11 and 12 of a catalyst metal film 10 by using a chemical vapor deposition (CVD) method. Catalyst metals used in forming the graphene 20 may include materials including at least some selected from the group consisting of nickel (Ni), cobalt (Co), iron (Fe), platinum (Pt), gold (Au), aluminum (Al), chromium (Cr), copper (Cu), magnesium (Mg), manganese (Mn), rhodium (Rh), silicon (Si), tantalum (Ta), titanium (Ti), tungsten (W), uranium (U), vanadium (V), and zirconium (Zr). However, the catalyst metal is not limited thereto, and may include other elements than those described above. By placing the catalyst metal film 10 into a synthesizing chamber together with hydrocarbon and hydrogen or the like and heating the same at a high temperature, the graphene 20 is formed on the two surfaces 11 and 12 of the catalyst metal film 10. The graphene 20 may be formed as a single layer or also as multiple layers according to types of catalyst metals or conditions inside the synthesizing chamber.

The catalyst metal film 10 on which the grapheme 20 is formed is put into the graphene transferring apparatus 1 illustrated in FIG. 1.

Referring to FIG. 1, the graphene transferring apparatus 1 includes a first unwinding reel 110, a second unwinding reel 120, a first roller 310, a second roller 320, a third roller 330, a fourth roller 340, a first winding reel 210, and a second winding reel 220.

A substrate film 30 having an adhesive first surface 31 is wound around the first unwinding reel 110 and the second unwinding reel 120; the first and second unwinding reels 110 and 120 unwind the substrate film 30 onto each of the two surfaces 11 and 12 of the catalyst metal film 10. The substrate film 30 that is disposed by being wound around the first unwinding reel 110 and the second unwinding reel 120 may comprise polyethylene terephthalate (PET), and may be plasma-treated or coated with an adhesive material so that the first surface 31 is adhesive. Moreover, the substrate film 30 may be formed of an internally adhesive material. Here, only the first surface 31 of the substrate film 30 is described as having adhesive properties, but the embodiment of the present invention is not limited thereto; the substrate film 30 may also be designed such that both the first surface 31 and a second surface 32 have adhesive properties.

Referring to FIG. 1, the substrate film 30 is disposed by being wound around the first unwinding reel 110 and the second unwinding reel 120 while a cover film 35 is attached on the adhesive first surface 31 in advance. The cover film 35 is not adhesive and thus may prevent the substrate film 30 from sticking and prevent penetration of foreign substances into the substrate film 30. The cover film 35 is taken off from the substrate film 30 using cover film collecting rollers 410 and 420 before the substrate film 30 is put between the first and second rollers 310 and 320, as illustrated in FIG. 1.

The first and second rollers 310 and 320 are symmetrically disposed with respect to a transfer path of the catalyst metal film 10 and are spaced apart from each other by a predetermined distance. The first roller 310 and the second roller 320 press the substrate film 30 that is unwound from the first unwinding reel 110 and the second unwinding reel 120 toward each of the surfaces 11 and 12 of the catalyst metal film 10 so as to adhere the adhesive first surface 31 of the substrate film 30 to the graphene 20 formed on the surfaces 11 and 12. That is, the first roller 310 adheres the substrate film 30 unwound from the first unwinding reel 110 to the graphene 20 formed on the surface 11 of the catalyst metal film 10, and the second roller 320 adheres the substrate film 30 unwound from the second unwinding reel 120 to the graphene 20 formed on the surface 12, which is opposite to the first surface 11 to which the substrate film 30 unwound from the first unwinding reel 110 is adhered, in the catalyst metal film 10.

The first and second rollers 310 and 320 may press the substrate 30 while heating the same in order to further effectively attach the graphene 20 to the substrate film 30.

Meanwhile, in addition to compressing the catalyst metal film 10 and the substrate film 30 to each other, the first roller 310 and the second roller 320 may transport the catalyst metal film 10 in a predetermined direction D1.

The third and fourth rollers 330 and 340 press the substrate film 30 between the first and second rollers 310 and 320 and the first and second winding reels 210 and 220 toward the catalyst metal film 10. That is, the third and fourth roller 330 and 340 are disposed such that the catalyst metal film 10 and the substrate film 30 which have passed between the first and second rollers 310 and 320 are interposed between the third and fourth rollers 310 and 320, thereby pressing the catalyst metal film 10 and the substrate film 30 which have passed through between the first and second rollers 310 and 320 one more time to compress the catalyst metal film 10 and the substrate film 30. Consequently, an adhesive force between the graphene 20 formed on the catalyst metal film 10 and the substrate film 30 may be further increased. The third and fourth rollers 330 and 340 may also press the substrate 30 while heating the same.

The first and second winding reel 210 and 220 separates the substrate film 30 that has passed between the first through fourth rollers 310, 320, 330, and 340 and winds the same.

Hereinafter, the substrate film attaching operation and the substrate film separating operation according to embodiments of the present invention, which are performed by using the above-described graphene transferring apparatus 1, will be described.

In the substrate film attaching operation, the substrate film 30 is disposed on the first and second surfaces 11 and 12 of the catalyst metal film 10 to which the graphene 20 is formed, and the catalyst metal film 10 and the substrate film 30 are put between the first and second rollers 310 and 320 so as to compress the graphene of the catalyst metal film 10 and the substrate film 30 using the first through fourth rollers 310, 320, 330, and 340. Here, the substrate film 30 is disposed such that the adhesive first surface 31 contacts the graphene 20. The catalyst metal film 10 and the substrate film 30 which are compressed against each other primarily by being passed between the first and second rollers 310 and 320 are further rigidly compressed against each other by being passed between the third and fourth rollers 330 and 340. That is, the catalyst metal film 10 and the substrate film 30 which are separated as illustrated in FIG. 2 are adhered to each other through this operation while having the graphene 20 interposed therebetween as illustrated in FIG. 3.

Next, the substrate film separating operation is performed. In the substrate film separating operation, the catalyst metal film 10 and the substrate film 30 adhered to each other by being passed between the first through fourth rollers 310, 320, 330, and 340 are separated again, and the separated substrate film 30 is wound around the first and second winding reels 210 and 220. The adhesive force between the substrate film 30 and the graphene 20 is greater than that between the catalyst metal film 10 and the graphene 20, and thus by separating the substrate film 30 from the catalyst metal film 10, the graphene 20 is separated from the catalyst metal film 10 together with the substrate film 30 as illustrated in FIG. 4. That is, the graphene 20 formed on the catalyst metal film 10 is transferred to the substrate film 30. Meanwhile, since the second surface 32 opposite to the first adhesive surface 31 of the substrate film 30 is not adhesive, even when the substrate film 30 is wound around the first and second winding reels 210 and 220, parts of the substrate film 30 do not stick to each other, and thus the graphene 20 may stably stay adhered to the substrate film 20.

Through the above-described operation, the substrate film 30 to which the graphene 20 is transferred may be used in the manufacture of substrates of various electronic products by undergoing operations such as a patterning process.

According to the graphene transferring method of the current embodiment of the present invention, no etching is required, and the graphene 20 may be directly transferred to the substrate film 30 from the catalyst metal film 10 without using a thermal release tape. Thus, the operation of transferring the graphene 20 may be further simplified and the speed of the operation may be increased. In addition, during the etching operation or when attaching or detaching the graphene 20 to and from the thermal release tape, damage to the graphene 20 may be prevented. As a result, damage to the graphene 20 may be effectively prevented in the operation of transferring the graphene 20.

Also, according to the method of transferring the graphene of the current embodiment of the present invention, the graphene 20 is formed on the two surfaces 11 and 12 of the catalyst metal film 10 and then the catalyst metal film 10 and the graphene 20 are transferred to two substrate films 30 at the same time. Thus, the speed of the graphene transferring operation is high.

Next, a method of transferring graphene according to another embodiment of the present invention will be described. Here, a graphene transferring apparatus according to another embodiment of the present invention is used.

Figure 5:
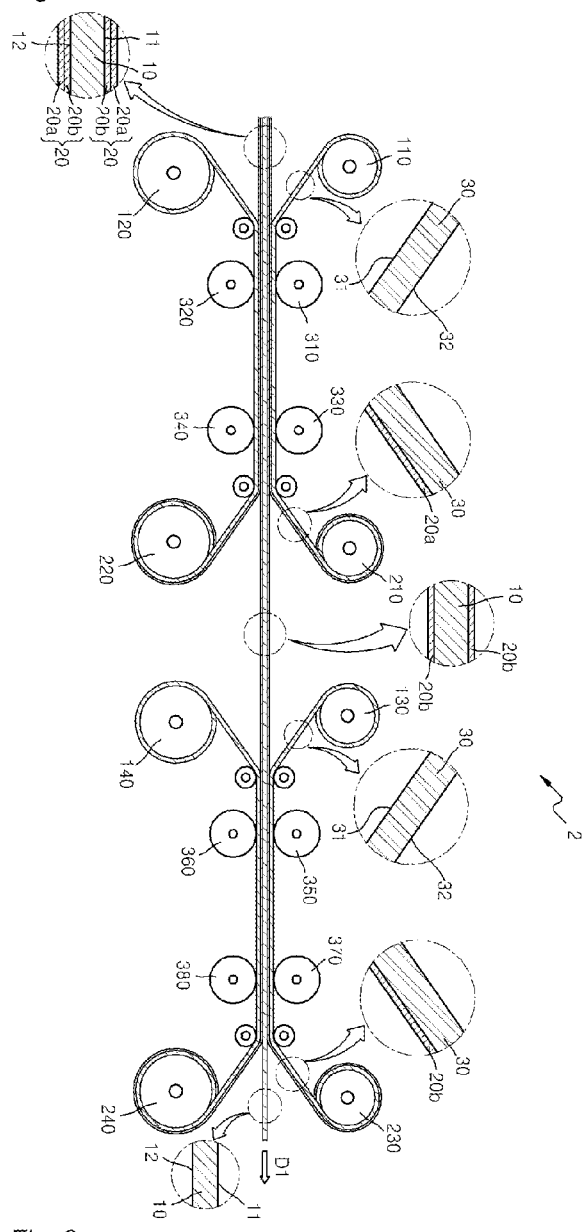
FIG. 5 is a schematic view illustrating a graphene transferring apparatus according to another embodiment of the present invention.
Figure 6:
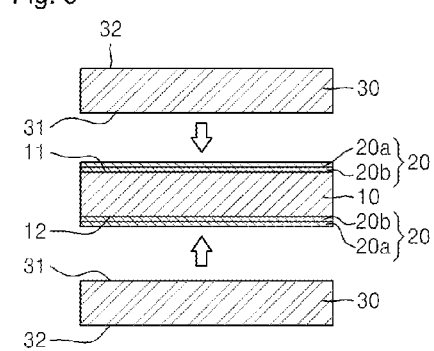
FIGS. 6 through 8 are cross-sectional views illustrating some operations in which graphene is transferred from a catalyst metal film to a substrate film by using the graphene transferring apparatus of FIG. 5, according to an embodiment of the present invention.
Figure 7:
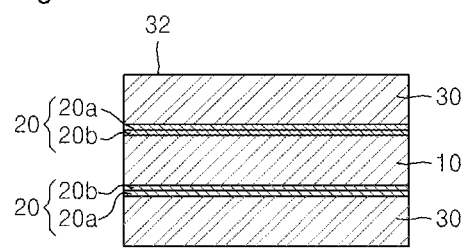
Figure 8:
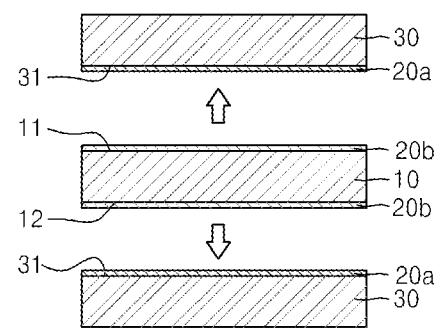

FIG. 5 is a schematic view illustrating a graphene transferring apparatus 2 according to another embodiment of the present invention. FIGS. 6 through 8 are cross-sectional views illustrating some of operations in which graphene is transferred from a catalyst metal film to a substrate film by using the graphene transferring apparatus of FIG. 5, according to an embodiment of the present invention.

The method of transferring graphene according to the current embodiment of the present invention also includes a graphene synthesizing operation, a substrate film attaching operation, and a substrate film separating operation.

As has been described with reference to the previous embodiment of the present invention, in the graphene synthesizing operation, graphene 20 is formed on two surfaces 11 and 12 of a catalyst metal film 10 by using a CVD method. According to the current embodiment, in order to form multi-layered graphenes 20 on the surfaces 11 and 12 of the catalyst metal film 10, the catalyst metal film 10 including at least one material selected from the group consisting of iron (Fe), nickel (Ni), cobalt (Co), platinum (Pt), iridium (Ir), and rubidium (Rb) is preferably used. This is because graphenes that are synthesized using the catalyst metal film 10 including at least one of these metals and using the CVD method frequently have a multi-layered structure.

The catalyst metal film 10 to which the multi-layer graphene 20 is formed on the first and second surfaces 11 and 12 through the graphene synthesizing operation is put into the graphene transferring apparatus 2 illustrated in FIG. 2.

Referring to FIG. 5, in addition to the same elements as the graphene transferring apparatus 1 of FIG. 1, the graphene transferring apparatus 2 further includes a third unwinding reel 130, a fourth unwinding reel 140, fifth through eighth rollers 350, 360, 370, and 380, a third winding reel 230, and a fourth winding reel 240.

The substrate film attaching operation is performed by placing a substrate film 30 that is unwound from the first and second unwinding reels 110 and 120 and the catalyst metal film 10 on which multi-layered graphene 20 is formed, between the first and second rollers 310 and 320. Although not shown in FIG. 5, a cover film as that illustrated in FIG. 1 may be attached to the adhesive first surface 31 of the substrate film 30 that is wound around the first and second unwinding reels 110 and 120; in this case, the cover film is taken off before the substrate film 30 is put between the first and second rollers 310 and 320.

As illustrated in FIG. 6, as the substrate film 30 and the catalyst metal film 10 that are separated from each other are compressed against each other by passing them between the first through fourth rollers 310, 320, 330, and 340.

When the substrate film attaching operation is completed, the substrate film 30 is wound around the first and second winding reels 210 and 220 so as to perform a substrate film separating operation in which the substrate film 30 is separated from the catalyst metal film 10. Since a bonding force between layers of the multi-layered graphene 20 is weak, when the substrate film 30 is separated from the catalyst metal film 10, only a graphene 20a adhered to the adhesive first surface 31 of the substrate film 30 is separated from the catalyst metal film 10 as illustrated in FIG. 8. That is, the graphene 20b contacting the surfaces 31 and 32 of the substrate film 30 remains on the catalyst metal film 10.

The substrate film attaching operation is performed again by placing the catalyst metal film 10, on the two surfaces 31 and 32 of which the graphene 20b is left, between the fifth roller 350 and the sixth roller 360 together with the substrate film 30 unwound from the third and fourth winding reels 130 and 140. Although not shown in FIG. 5, a cover film may also be attached to the adhesive first surface 31 of the substrate film 30 that is wound around the third and fourth winding reels 130 and 140, and in this case, the cover film is taken off before the substrate film 30 is put between the fifth and sixth rollers 350 and 360.

The fifth through eighth rollers 350, 360, 370, and 380 compress the substrate film 30 wound from the third and fourth winding reels 130 and 140 against the catalyst metal film 10 that is separated from the substrate film 30 unwound from the first and second unwinding reels 110 and 120. Accordingly, as the catalyst metal film 10 and the substrate film 30 that are placed between the fifth roller 350 and the sixth roller 360 pass through between the fifth through eighth rollers 350, 360, 370, and 380, they are compressed against each other to be in a condition as illustrated in FIG. 3.

Next, the substrate film separating operation is performed again, in which the substrate film 30 is separated from the catalyst metal film 10 by winding the substrate film 30 around the third and fourth winding reels 230 and 240. In this operation, the substrate film 30 is separated from the catalyst metal film 10 to take off the graphene 20b remaining on the catalyst metal film 10, as illustrated in FIG. 4.

According to the graphene transferring method of the current embodiment of the present invention, the multiple layers of the graphene 20 formed on the catalyst metal film 10 may be sequentially separated from the catalyst metal film 10 and transferred to the substrate film 20. Accordingly, just by synthesizing graphene one time, the graphene 20 may be transferred to the substrate film 30 multiple times, and thus the speed of transferring the graphene 20 may be increased effectively.

While the graphene transferring method and the graphene transferring apparatuses 1 and 2 according to the embodiments of the present invention are described above, the embodiments of the present invention are not limited thereto, and may be embodied in various forms without departing from the spirit and scope of the technology of the invention.

For example, while graphene is transferred in a reel-to-reel method in the above-described embodiments, the graphene may also be transferred by first forming graphene on a panel-type catalyst metal and attaching a panel-type substrate film to the graphene and then separating the substrate film from the graphene.

In addition, while the graphene 20 is separated layer by layer from the catalyst metal film 10, the graphene 20 including a plurality of layers may also be transferred to the substrate film 30 according to the strength of an adhesive force of the substrate film 30.

Furthermore, while the graphene 20 is formed on the first and second surfaces 11 and 12 of the catalyst metal film 10 in the above embodiments, graphene may instead be formed only on a single surface of the catalyst metal film 10. In this case, the second unwinding reel 120, the second winding reel 220, the fourth unwinding reel 140, and the fourth winding reel 240 may be omitted from the graphene transferring apparatuses 1 and 2. In addition, while being transported in a predetermined direction by a conveyor belt, the catalyst metal film 10 may be compressed only by using the first, third, fifth, and seventh rollers 310, 330, 350, and 370.

According to the method of transferring graphene according to an embodiment of the present invention, graphene formed on a catalyst metal is directly transferred to the substrate film. Accordingly, the graphene transferring method may be simplified and a speed thereof may be increased, and damage to the graphene caused during a graphene transferring operation may be effectively reduced.

In addition, the method of transferring graphene may be effectively performed by using the apparatus for manufacturing graphene according to another embodiment of the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention relates to methods and apparatuses for transferring graphene to a substrate.

The invention claimed is:

1. A graphene transferring apparatus comprising:
   a catalyst metal film, on at least one surface of which a plurality of layers of graphene formed, wherein the catalyst metal film is transported in a predetermined direction;
   a first unwinding reel which unwinds a substrate film having an adhesive first surface around the first unwinding reel;
   a first roller that presses the substrate film toward the catalyst metal film so that the adhesive first surface of the substrate film which is unwound from the first unwinding reel is adhered to an outermost layer of the plurality of the layers of graphene;
   a first winding reel that separates the substrate film from the catalyst metal film that has passed through the first roller and winds the separated substrate film; and
   a third unwinding reel which unwinds a substrate film having an adhesive first surface around the third unwinding reel;
   a fifth roller that compresses a third substrate film unwound from the third unwinding reel against the catalyst metal film, from which the substrate film unwound from the first unwinding reel is separated; and
   a third winding reel that separates the third substrate film from the catalyst metal film that has passed the fifth roller and winds the third substrate film.

2. The graphene transferring apparatus of claim 1, wherein the plurality of layers of graphene are formed on both surfaces of the catalyst metal film, and
   wherein the graphene transferring apparatus further comprises:
   a second unwinding reel which unwinds a substrate film having an adhesive first surface around the second unwinding reel;
   a second roller that presses the substrate film toward the catalyst metal film so that the adhesive first surface of the substrate film which is unwound from the second unwinding reel is adhered to at least one layer of the plurality of layers of graphene; and
   a second winding reel that separates the substrate film from the catalyst metal film that has passed the second roller and winds the separated substrate film.

3. The graphene transferring apparatus of claim 1, further comprising a third roller that presses the substrate film between the first roller and the first winding reel toward the catalyst metal film.

4. The graphene transferring apparatus of claim 3, further comprising a fourth roller that presses the substrate film and the catalyst metal film,
   wherein the substrate film and the catalyst metal film are disposed between the third roller and the fourth roller.

* * * * *